Sept. 8, 1925.                                            1,553,205
                          S. TOTH
                HARROW ATTACHMENT FOR PLOWS
                    Filed Jan. 13, 1925
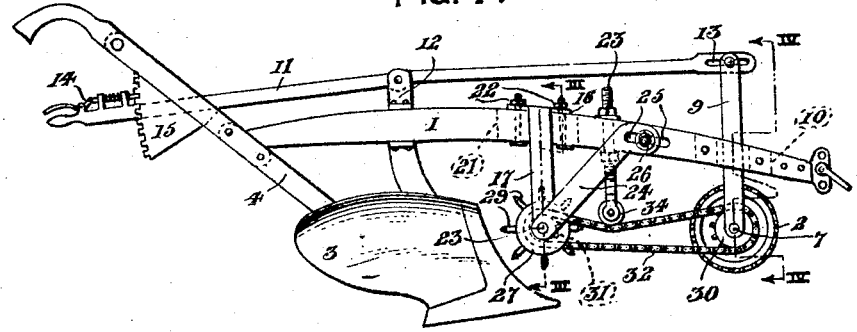
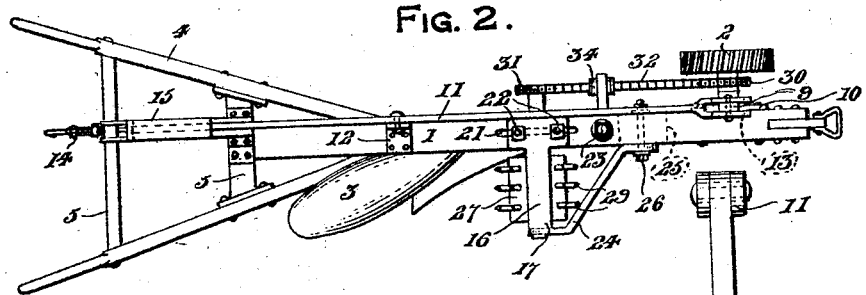
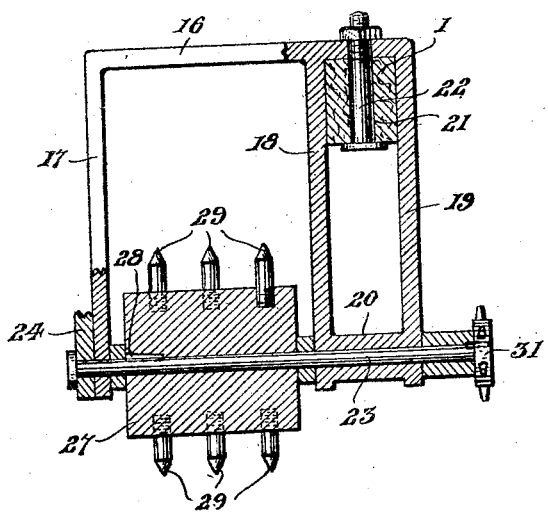
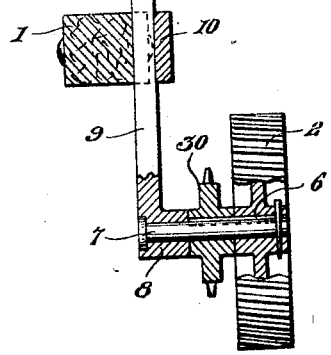
Inventor
S. Toth
By Bryant & Lowry
        Attorneys Patented Sept. 8, 1925.

1,553,205

UNITED STATES PATENT OFFICE.

STEVE TOTH, OF WHITSETT, PENNSYLVANIA.

HARROW ATTACHMENT FOR PLOWS.

Application filed January 13, 1925. Serial No. 2,105.

*To all whom it may concern:*

Be it known that I, STEVE TOTH, a citizen of Hungary, residing at Whitsett, in the county of Fayette and State of Pennsylvania, have invented certain new and useful Improvements in Harrow Attachments for Plows, of which the following is a specification.

This invention relates to certain new and useful improvements in harrow attachments for plows and has for one of its objects to provide an adjustably mounted harrow upon the beam of a plow in proximity to the plow point and mold board for contact with a clod of earth raised by the plow for breaking up and disintegrating the clod during the plowing operation.

A further object of the invention is to provide a harrow attachment for plows of the type above set forth wherein the harrow attachment is positively driven by chain and sprocket mechanism extending between the ground engaging wheel at the forward end of the plow beam and the harrow attachment to insure a thorough disintegration of a clod elevated by the plow.

It is a further object of the invention to adjustably support the harrow attachment longitudinally of the plow beam to change the position thereof with respect to the plow point and mold board.

With the above general objects in view and others that will appear as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a side elevational view of a plow equipped with the harrow attachment showing the chain and sprocket connection between the forward supporting wheel of the plow beam and harrow attachment, Figure 2 is a top plan view of the device, Figure 3 is a vertical cross-sectional view taken on line III—III of Fig. 1, and Figure 4 is a vertical cross-sectional view taken on line IV—IV of Fig. 1.

The plow disclosed in this application includes a beam 1 having the ground engaging wheel 2 at the forward end thereof with the plow blade 3 depending therefrom intermediate its ends. The rear end of the beam has the usual handles 4 connected thereto, the same diverging as shown in Fig. 2 and braced by the cross bars 5.

The ground wheel 2 is vertically adjustable and is keyed as at 6 to the shaft 7 that is journaled in the slot 8 carried by the lower end of the vertically shiftable rod 9. As shown more clearly in Figs. 1 and 4, the rod 9 engages one side of the beam 1 and is enclosed by a strap 10 to permit vertical shifting movements thereof. The shifting means for the rod 9 and ground wheel 2 includes a lever 11 pivoted intermediate its ends upon the bracket 12 supported upon the plow beam 1 as shown in Figs. 1 and 2, the forward end of the lever 11 being bifurcated and having a pin and slot connection 13 with the upper end of the rod 9 while the rear end of said lever carries a tensioned latch 14 cooperating with the rack segment 15 that is supported upon one of the cross bars 5 as shown in Fig. 2. It will therefore be seen that upon operating the lever 11, the ground engaging wheel 2 may be raised or lowered relative to the plow beam 1 and plow blade 3 for varying the depth of cut of the plow blade.

The harrow attachment includes a bracket shown in detail in Fig. 3 having an upper horizontal arm 15 carrying spaced depending legs 17, 18 and 19, the legs 18 and 19 being disposed adjacent each other and connected at their lower ends by a bearing block 20. The plow beam 1 is enclosed between the upper ends of the legs 18 and 19 and a longitudinally extending vertical slot 21 is formed in the plow beam beneath the bracket arm 16 and through which adjusting bolts 22 extend as shown in Fig. 3 for holding the bracket in its longitudinally adjusted position. As shown in Fig. 3, a shaft 23 is journaled in the bearing block 20 of the legs 18 and 19 and in the lower end of the leg 17 and to retain the legs in vertical positions, an angle brace 24 extends between the end of the shaft 23 adjacent the leg 17 and the plow beam 1 as shown in Figs. 1 and 2. The shaft 23 is journaled through the lower end of the angle brace 24 while registering slotted openings 25 formed in the upper end of the brace 24 and plow beam 1 receive an adjusting bolt 26 to permit shifting movements of the angle brace with the harrow supporting bracket.

The harrow includes a drum or cylinder 27 keyed as at 28 to the shaft 23 between the legs 17 and 18 with earth working spurs 29 projecting outwardly from the peripheral surface thereof. Driving mechanism for the harrow attachment includes a sprocket wheel 30 keyed to the shaft 7 as shown in Fig. 4 between the ground engaging wheel 2 and the bearing block 8 at the lower end of the rod 9 and is in alinement with a sprocket wheel 31 fixed to the adjacent end of the shaft 23, the sprocket wheels 30 and 31 being enclosed by the sprocket chain 32 for communicating rotary motion to the harrow cylinder 27 from the ground wheel 2. To compensate for slack in the sprocket chain 32, a screw rod 33 associated with the plow beam 1 carries a roller 34 at its lower end that is disposed for engagement with the upper section of the endless sprocket chain 32 as shown in Figs. 1 and 2.

While there is herein shown and described the preferred embodiment of the present invention, it is nevertheless to be understood that minor changes may be made therein without departing from the spirit and scope of the invention as claimed.

What is claimed as new is:—

1. In a harrow attachment for plows, the combination with a plow beam, of a bracket longitudinally adjustable on the beam, a rotatable harrow carried by the bracket, a ground wheel at the forward end of the beam, chain and sprocket mechanism between the wheel and harrow, an angle brace carried by the bracket having an adjustable connection with the beam, a vertically shiftable rod supporting the ground wheel, a lever supported on the beam and attached to the upper end of the rod and a slack adjuster for the chain carried by the beam.

2. In a harrow attachment for plows, the combination with a plow beam, of a bracket longitudinally adjustable on the beam, a rotatable harrow carried by the bracket, a ground wheel at the forward end of the beam, chain and sprocket mechanism between the wheel and harrow, an angle brace carried by the bracket having an adjustable connection with the beam, a vertically shiftable rod supporting the ground wheel, a lever supported on the beam and attached to the upper end of the rod, and a slack adjuster for the chain carried by the beam.

In testimony whereof I affix my signature.

STEVE TOTH.